(12) United States Patent
Hayashi

(10) Patent No.: US 11,936,997 B2
(45) Date of Patent: Mar. 19, 2024

(54) IMAGE PROCESSING APPARATUS, IMAGE PROCESSING METHOD, AND NON-TRANSITORY COMPUTER READABLE MEDIUM

(71) Applicant: JVCKENWOOD Corporation, Yokohama (JP)

(72) Inventor: Keita Hayashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 107 days.

(21) Appl. No.: 17/833,332

(22) Filed: Jun. 6, 2022

(65) Prior Publication Data

US 2022/0377263 A1  Nov. 24, 2022

Related U.S. Application Data

(63) Continuation of application No. PCT/JP2020/039486, filed on Oct. 21, 2020.

(30) Foreign Application Priority Data

Jan. 6, 2020 (JP) .................................. 2020-000410

(51) Int. Cl.
*H04N 25/57* (2023.01)
*H04N 5/33* (2023.01)

(52) U.S. Cl.
CPC ............... *H04N 25/57* (2023.01); *H04N 5/33* (2013.01)

(58) Field of Classification Search
CPC .......... H04N 25/57; H04N 5/33; H04N 25/68; G01J 1/02; G01J 1/42
See application file for complete search history.

(56) References Cited

U.S. PATENT DOCUMENTS

| 6,521,892 | B2 * | 2/2003 | Emanuel .................. B60R 1/00 |
| | | | 250/341.5 |
| 7,772,557 | B2 * | 8/2010 | Anderson ............ H04N 25/673 |
| | | | 250/252.1 |
| 8,957,373 | B1 | 2/2015 | Tiana et al. |
| 9,102,776 | B1 | 8/2015 | Kostrzewa et al. |
| 11,012,594 | B2 * | 5/2021 | Kuybeda .............. H04N 25/627 |

FOREIGN PATENT DOCUMENTS

JP  2009005120 A  1/2009

* cited by examiner

*Primary Examiner* — Ahmed A Berhan
(74) *Attorney, Agent, or Firm* — Procopio, Cory, Hargreaves & Savitch LLP

(57) ABSTRACT

An image processing apparatus includes a saturated region detection unit, a dynamic range control unit, and a shutter control unit. The saturated region detection unit acquires imaging data from an infrared imaging device that captures a thermal image of an outside of a mobile body, and detects that a saturated pixel is present in the imaging data. The dynamic range control unit sets, in accordance with a result of the detection of the saturated region, a dynamic range of the infrared imaging device to a first temperature range, or a second temperature range where a temperature at least on an upper limit side is higher than that in the first temperature range. The shutter control unit controls opening and closing of a shutter for protecting the infrared imaging device based on the result of the detection of the saturated region and the setting of the dynamic range.

6 Claims, 9 Drawing Sheets

DYNAMIC RANGE SETTING : FIRST RANGE

DYNAMIC RANGE SETTING : SECOND RANGE

DYNAMIC RANGE SETTING : SECOND RANGE

IMAGE PROCESSING APPARATUS, IMAGE PROCESSING METHOD, AND NON-TRANSITORY COMPUTER READABLE MEDIUM

CROSS REFERENCE TO RELATED APPLICATION

The present application is based upon and claims the benefit of priority from Japanese Patent Application No. 2020-000410, filed on Jan. 6, 2020, the disclosure of which is incorporated herein in its entirety by reference.

BACKGROUND

The present invention relates to an image processing apparatus, an image processing method, and a non-transitory computer readable medium.

A large number of object detection systems using infrared cameras have been developed. Further, it is expected that such an object detection system will be used, for example, to improve the safety of an automobile. Meanwhile, because of the characteristics of the infrared camera that detects the heat of an object, an abnormality may occur in a microbolometer used as an imaging device when an image of sunlight is captured. Therefore, there is a demand for a technology to reduce the effects of sunlight.

For example, in the far-infrared imaging apparatus disclosed in Japanese Unexamined Patent Application Publication No. 2009-005120, it is determined whether or not the quantity of far-infrared rays detected using far-infrared ray detection pixels is equal to or greater than a first quantity, and a shutter is closed when there is a far-infrared ray detection pixel in which the quantity of far-infrared rays detected is equal to or greater than the first quantity. Meanwhile, after the shutter is closed, it is determined for each far-infrared ray detection pixel whether or not the quantity of far-infrared rays detected is less than a second quantity that is smaller than or equal to the first quantity, and the shutter is opened when the quantity of far-infrared rays detected for each of all the far-infrared ray detection pixels is less than the second quantity.

SUMMARY

A microbolometer with a reduced dynamic range included in an infrared imaging apparatus is used in order to improve the resolution for object detection. In such a case, a detection signal is saturated even in a temperature range in which an abnormality does not occur in the microbolometer. Therefore, the infrared imaging apparatus may close the shutter more than necessary to protect the microbolometer. However, since the object detection function cannot be used during the period when the shutter is closed, a technique for properly closing the shutter as required is expected.

The present embodiment has been made in order to solve the above-described problem, and an object thereof is to provide an image processing apparatus and the like that appropriately detect sunlight and then protect an infrared sensor from the sunlight.

An image processing apparatus according to the present embodiment includes a saturated region detection unit, a dynamic range control unit, and a shutter control unit. The saturated region detection unit acquires imaging data from an infrared imaging device configured to capture a thermal image of an outside of a mobile body, and detects that a saturated pixel is present in the imaging data. The dynamic range control unit sets, in accordance with a result of the detection of the saturated region, a dynamic range of the infrared imaging device to a first temperature range, or a second temperature range where a temperature at least on an upper limit side is higher than that in the first temperature range. The shutter control unit controls opening and closing of a shutter for protecting the infrared imaging device based on the result of the detection of the saturated region and the setting of the dynamic range.

An image processing method according to the present embodiment includes a saturated region detection step, a dynamic range control step, and a shutter control step. In the saturated region detection step, imaging data is acquired from an infrared imaging device configured to capture a thermal image of an outside of a mobile body, and a saturated region detection for detecting that a saturated pixel is present in the imaging data is performed. In the dynamic range control step, a dynamic range of the infrared imaging device is set, in accordance with a result of the detection of the saturated region, to a first temperature range, or a second temperature range where a temperature at least on an upper limit side is higher than that in the first temperature range. In the shutter control step, opening and closing of a shutter for protecting the infrared imaging device is controlled based on the result of the detection of the saturated region and the setting of the dynamic range.

A program according to the present embodiment causes a computer to execute the following image processing method. The image processing method includes a saturated region detection step, a dynamic range control step, and a shutter control step. In the saturated region detection step, imaging data is acquired from an infrared imaging device configured to capture a thermal image of an outside of a mobile body, and a saturated region detection for detecting that a saturated pixel is present in the imaging data is performed. In the dynamic range control step, a dynamic range of the infrared imaging device is set, in accordance with a result of the detection of the saturated region, to a first temperature range, or a second temperature range where a temperature at least on an upper limit side is higher than that in the first temperature range. In the shutter control step, opening and closing of a shutter for protecting the infrared imaging device is controlled based on the result of the detection of the saturated region and the setting of the dynamic range.

According to the present embodiment, it is possible to provide an image processing apparatus and the like that appropriately detect sunlight and then protect an infrared sensor from the sunlight.

DETAILED DESCRIPTION

The present invention will be described hereinafter through embodiments of the present invention. However, the following embodiments are not intended to limit the scope of the invention according to the claims. Further, all the components described in the embodiments are not necessarily indispensable as means for solving the problem. For the clarification of the description, the following descriptions and the drawings are partially omitted and simplified as appropriate. Note that the same elements are denoted by the same reference symbols throughout the drawings, and redundant descriptions are omitted as necessary.

First Embodiment

Figure 1:
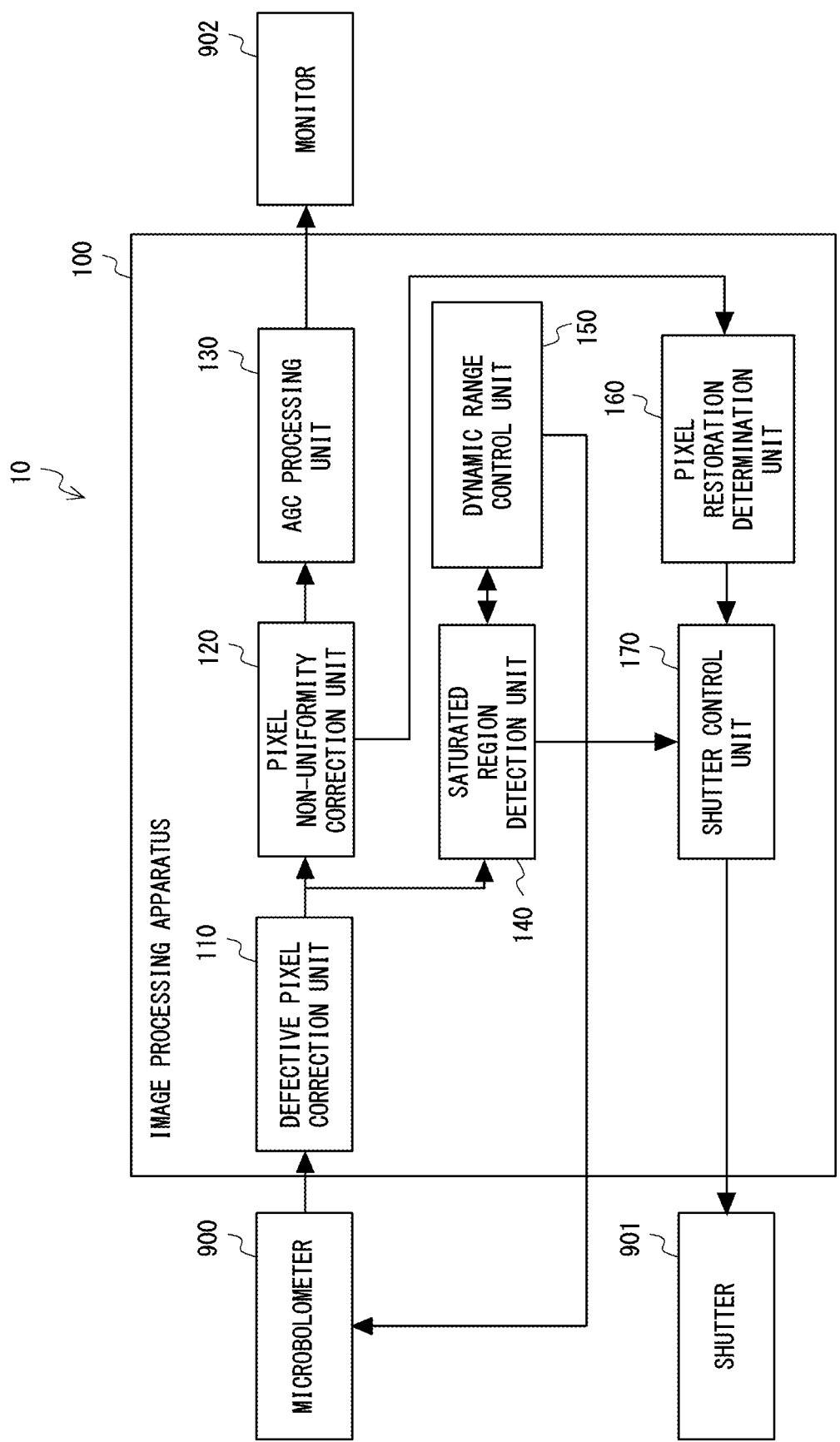
FIG. 1 is a block diagram of an image processing apparatus according to a first embodiment.

Embodiments of the present invention will be described hereinafter with reference to the drawings. FIG. 1 is a block diagram of an image processing apparatus according to a first embodiment. An image processing apparatus 100 shown in FIG. 1 is a component of a thermal image display system 10 that captures a thermal image of the outside of an automobile and displays it on a monitor. The thermal image display system 10 mainly includes the image processing apparatus 100, a microbolometer 900, a shutter 901, and a monitor 902.

The image processing apparatus 100 will be described below. The image processing apparatus 100 includes an arithmetic unit such as a Central Processing Unit (CPU) or a Micro Controller Unit (MCU). Further, the image processing apparatus 100 includes, in addition to the aforementioned arithmetic unit, at least a non-volatile or a volatile memory such as a flash memory or a Dynamic Random Access Memory (DRAM), and a control board comprising other electric circuits. In the image processing apparatus 100, programs are installed in the aforementioned arithmetic unit and the like, and the following functions are implemented by a combination of software and hardware.

The image processing apparatus 100 acquires imaging data of a thermal image captured by the microbolometer 900, and performs preset processing on the acquired imaging data. The image processing apparatus 100 outputs the imaging data on which it has performed the preset processing to the monitor 902. The image processing apparatus 100 mainly includes a defective pixel correction unit 110, a pixel non-uniformity correction unit 120, an Auto-Gain-Control (AGC) processing unit 130, a saturated region detection unit 140, a dynamic range control unit 150, a pixel restoration determination unit 160, and a shutter control unit 170. The image processing apparatus 100 may include a recognition processing unit that recognizes a person or the like based on a thermal image captured by the microbolometer 900.

The defective pixel correction unit 110 receives imaging data from the microbolometer 900 and corrects data having defective pixels included in the imaging data. For example, the defective pixel correction unit 110 detects the coordinates of the defective pixels in a state in which the shutter is closed, and stores the detected coordinates of the defective pixels. Further, the defective pixel correction unit 110 corrects the stored data of the defective pixels by generating interpolation data from data of the adjacent pixels. The defective pixel correction unit 110 supplies the corrected imaging data to the pixel non-uniformity correction unit 120 and the saturated region detection unit 140, respectively.

The pixel non-uniformity correction unit 120 corrects the non-uniform state that has occurred in each pixel of the imaging data received from the defective pixel correction unit 110. The non-uniform state of each pixel is caused by, for example, the variation in characteristics of the pixels. The pixel non-uniformity correction unit 120 corrects the imaging data by adjusting the gain or the offset of each pixel using, for example, a method called Non-Uniformity Correction (NUC). The pixel non-uniformity correction unit 120 supplies the corrected imaging data to the AGC processing unit 130 and the pixel restoration determination unit 160, respectively.

The AGC processing unit 130 receives the imaging data from the pixel non-uniformity correction unit 120 and adjusts the contrast of the imaging data. The AGC processing unit 130 adjusts the contrast of the imaging data, to thereby generate an image which it is easy for a user to recognize when the thermal image is displayed on the monitor 902. Further, by adjusting the contrast of the imaging data, when the object recognition processing is performed on the thermal image, the AGC processing unit 130 can output a thermal image that is suitable for recognition processing. The AGC processing unit 130 uses, for example, a histogram equalization method such as contrast limitation adaptive histogram equalization for the imaging data.

The saturated region detection unit 140 receives imaging data from the defective pixel correction unit 110 and detects a saturated region from the received imaging data. The saturated region is a region in which a saturated pixel or a pixel substantially saturated is present. The saturated pixel refers to a pixel in a state in which the value of pixel data reaches an upper limit. For example, when a luminance level of each pixel of imaging data is expressed by eight bits from 0 to 255, a pixel of the coordinate in which a luminance level is 255 is referred to as a saturated pixel.

For example, when the saturated region detection unit 140 detects that four or more adjacent pixels are saturated pixels, it determines that a saturated region is present. Alternatively, for example, when a luminance value of each of nine or more adjacent pixels is 98% or more of the upper limit of the luminance value, the saturated region detection unit 140 determines that a saturated region is present. When the saturated region detection unit 140 detects that a saturated region is present in the received imaging data, it supplies a signal indicating a result of the detection of the saturated region to the dynamic range control unit 150.

Further, the saturated region detection unit 140 acquires information about the setting of the dynamic range from the dynamic range control unit 150. The information about the setting of the dynamic range includes information indicating whether the dynamic range set in the microbolometer 900 is set to a first temperature range or a second temperature range. The first temperature range is set so that, for example, a temperature range detected by the microbolometer is 10 to 50 degrees. The second temperature range is a range in which the upper limit is set higher than that of the first temperature range, and is set so that, for example, a temperature range detected by the microbolometer is 10 to 200 degrees. When the dynamic range is set to the second temperature range and the saturated region detection unit 140 detects the above-described saturated region in the acquired imaging data, the saturated region detection unit 140 supplies a signal for instructing that the shutter is to be closed to the shutter control unit 170.

The dynamic range control unit 150, in cooperation with the saturated region detection unit 140, sets the dynamic range of the microbolometer to the first temperature range or the second temperature range in which the temperature on at least the upper limit side is higher than that of the first temperature range in accordance with the result of the detection of the saturated region. The dynamic range control unit 150 is connected to the saturated region detection unit 140 and receives a signal indicating that a saturated region has been detected. Further, the dynamic range control unit 150 is connected to the microbolometer 900 and supplies a signal for instructing that the dynamic range is to be set. Note that the dynamic range in this embodiment may also be referred as a "scene dynamic range".

More specifically, for example, when the dynamic range is set to the first temperature range and the saturated region detection unit 140 detects a saturated region, the dynamic range control unit 150 changes the setting of the dynamic range from the first temperature range to the second temperature range. Further, for example, when the dynamic range is set to the second temperature range and the saturated region detection unit 140 does not detect a saturated region, the dynamic range control unit 150 changes the setting of the dynamic range from the second temperature range to the first temperature range.

Note that when the dynamic range control unit 150 performs processing for setting the dynamic range to the first temperature range and the second temperature range, the dynamic range control unit 150, for example, changes the setting of an integration time of the microbolometer 900. The microbolometer 900 changes the exposure time by changing the setting of the integration time. When the integration time becomes relatively short, the dynamic range of a signal output from the microbolometer 900 becomes relatively wide. That is, when the dynamic range is changed from the first temperature range to the second temperature range, the dynamic range control unit 150 sends an instruction to the microbolometer 900 to reduce the integration time.

Note that the instruction about the dynamic range may be an instruction about the setting of gain instead of the setting of the integration time. In a case in which the gain is set, when the dynamic range is changed from the first temperature range to the second temperature range, the dynamic range control unit 150 sends an instruction to the microbolometer 900 to reduce the gain.

The pixel restoration determination unit 160 receives information about the luminance value of the imaging data from the pixel non-uniformity correction unit 120, and detects the presence or absence of an abnormal region from the received information. The abnormal region is a region including pixel data in an abnormal state.

The presence or absence of an abnormal region is detected by, for example, comparing pixel data with a frame average value in a state in which the shutter is closed, that is, in a state in which an image of a thermally uniform surface is captured, and detecting a pixel having a value different from the frame average value by a predetermined value or more as an abnormal pixel. A region in which a plurality of abnormal pixels are present is defined as an abnormal region.

A case in which a state of pixel data is changed from a normal state to an abnormal state will be described below. When the microbolometer 900 captures an image of the sun, the luminance value of each of the pixels in the region in which an image of the sun is captured reaches the upper limit and becomes saturated. In general, the microbolometer 900 is designed so that an upper limit of the dynamic range is, for example, 200 degrees. In this case, even when the dynamic range is set to 200 degrees, which is the upper limit, the pixels in which an image of the sun is captured are saturated. At this time, a state of the imaging device that has captured an image of the sun is changed from a normal state to an abnormal state in which it cannot correctly output a signal. Further, it is known that it takes a certain amount of time for the imaging device in an abnormal state to return to a normal state even after it is protected from sunlight by closing the shutter.

Therefore, the pixel restoration determination unit 160 detects the presence or absence of an abnormal region in imaging data generated in a state in which the shutter is closed. The pixel restoration determination unit 160 supplies information about the presence or absence of an abnormal region to the shutter control unit 170.

The shutter control unit 170 controls opening and closing of the shutter for protecting an infrared imaging device based on a result of the detection of the saturated region and the setting of the dynamic range. For example, when the saturated region detection unit detects the saturated region in a state in which the dynamic range is set to the second temperature range, the shutter control unit 170 closes the shutter. More specifically, the shutter control unit 170 is connected to the saturated region detection unit 140 and receives an instruction that the shutter 901 is to be closed from the saturated region detection unit 140. When the shutter control unit 170 receives the instruction that the shutter 901 is to be closed from the saturated region detection unit 140, it closes the shutter 901 in accordance with this instruction.

Further, the shutter control unit 170 is connected to the pixel restoration determination unit 160 and receives information about the presence or absence of an abnormal region in the imaging data generated in a state in which the shutter 901 is closed. When the shutter control unit 170 receives information indicating that an abnormal region is present in the imaging data generated in a state in which the shutter 901 is closed, it keeps the shutter 901 in a state in which it is closed. On the other hand, when the shutter control unit 170 receives information indicating that there is no abnormal region present in the imaging data generated in a state in which the shutter 901 is closed, the shutter control unit 170 performs processing for opening the shutter 901 that is closed. The shutter control unit 170 also periodically performs control so as to close the shutter 901 in order to periodically correct the temperature of the microbolometer 900.

The image processing apparatus 100 has been described above. Next, an overview of each component connected to the image processing apparatus 100 will be described.

The microbolometer 900 is an embodiment of an infrared imaging device. The microbolometer 900 is composed of infrared detection elements arranged in a matrix. The infrared detection elements detect far-infrared rays. Further, the microbolometer 900 performs photoelectric conversion of the detected far-infrared rays to generate imaging data, and supplies the generated imaging data to the defective pixel correction unit 110 of the image processing apparatus 100.

The microbolometer 900 is mounted on a mobile body so that it captures a thermal image of the outside of the mobile body. When the mobile body is an automobile, the microbolometer 900 is installed therein so as to face in the direction to the front of the automobile so that it can capture an image of the traveling direction of the automobile. However, it may instead be installed in the automobile so as to face in other directions.

The shutter 901 allows external light to enter the microbolometer 900 or prevents external light from entering it. These operations performed by the shutter 901 are controlled by the shutter control unit 170. When the shutter 901 is open, the shutter 901 allows external light to pass through it, and thus causes the microbolometer 900 to receive the external light. When the shutter 901 is closed, the shutter 901 blocks external light to protect the microbolometer 900 from the external light. Further, the shutter 901 has a function of correcting the temperature of the microbolometer 900.

The monitor 902 is a display apparatus installed so that it can present information to a user, and includes, for example, a liquid crystal panel or an organic Electro Luminescence (EL) panel. The monitor 902 is connected to the AGC processing unit 130 of the image processing apparatus 100, receives imaging data from the AGC processing unit 130, and displays the received imaging data. The monitor 902 may display the imaging data including an image showing a recognized person.

Figure 2:
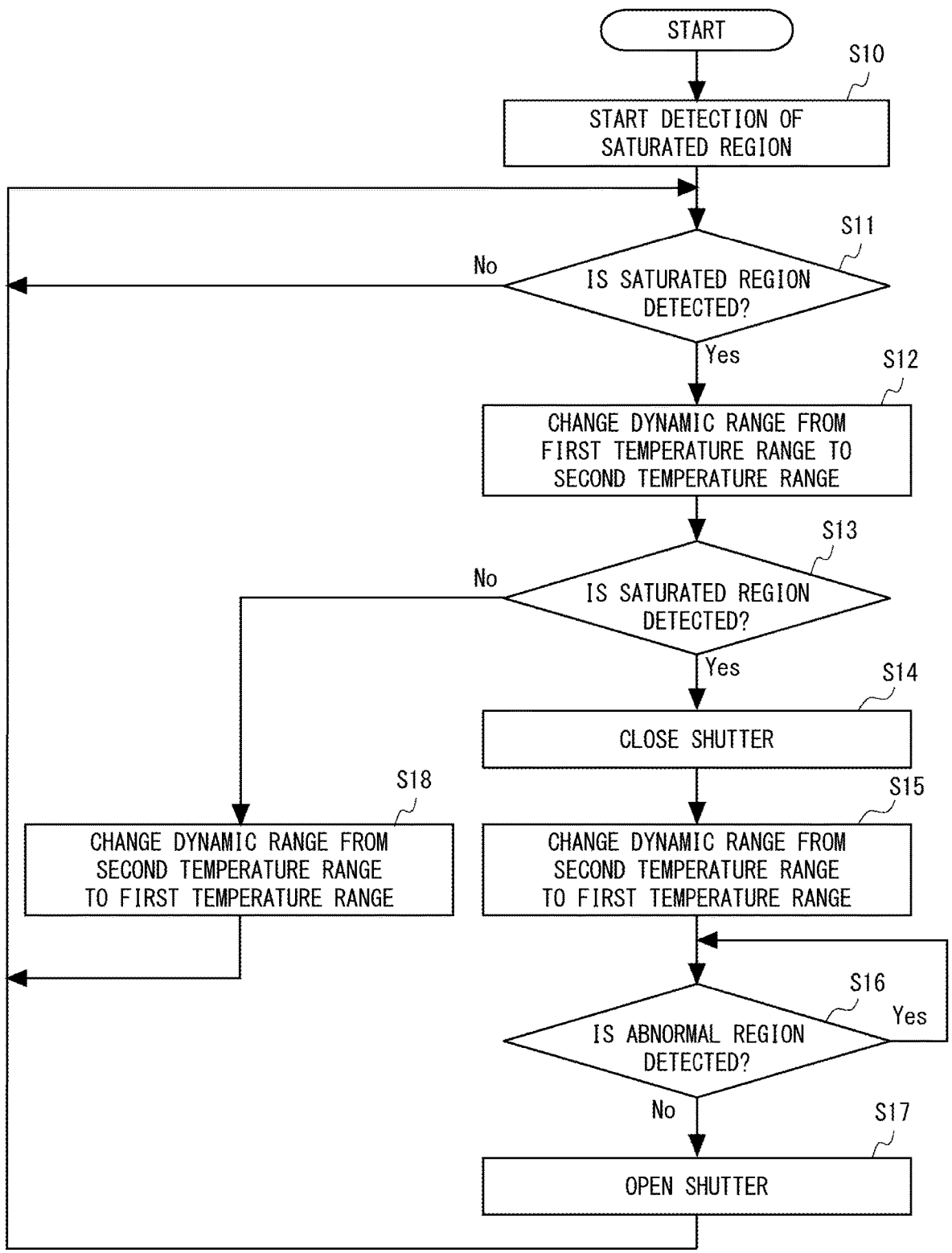
FIG. 2 is a flowchart of the image processing apparatus according to the first embodiment.

Next, processes performed by the image processing apparatus 100 according to the first embodiment will be described. FIG. 2 is a flowchart of the image processing apparatus according to the first embodiment. The flowchart shown in FIG. 2 is started when the image processing apparatus 100 receives imaging data from the microbolometer 900. Note that when the processes described in FIG. 2 are started, the dynamic range of the microbolometer 900 is set to the first temperature range (e.g., 10 to 50 degrees). Note that in the flowchart shown in FIG. 2, a description is given which focuses on the processes performed by the saturated region detection unit 140, the dynamic range control unit 150, the pixel restoration determination unit 160, and the shutter control unit 170, and the processes performed by other components are omitted as appropriate. However, the processes and the flow of signals of the other components are as described with reference to FIG. 1.

First, when the image processing apparatus 100 receives imaging data from the microbolometer 900, the saturated region detection unit 140 starts detection of a saturated region (Step S10). Next, the image processing apparatus 100 determines whether or not a saturated region is detected in the imaging data (Step S11).

If the image processing apparatus 100 does not determine that a saturated region is detected in the imaging data (Step S11: No), it repeats Step S11. That is, the image processing apparatus 100 successively detects a saturated region in imaging data to be acquired.

If the image processing apparatus 100 determines that a saturated region is detected in the imaging data (Step S11: Yes), it changes the dynamic range from the first temperature range to the second temperature range (e.g., from 10 degrees to 200 degrees) (Step S12).

Next, the image processing apparatus 100 determines whether or not a saturated region is detected in the imaging data generated after the dynamic range is changed (Step S13). The reason for performing the above processes is that even when a saturated region is detected in the first temperature range, there is a possibility that the detected saturated region is not a region saturated by sunlight. That is, by detecting a saturated region in the imaging data in which the dynamic range is extended from the first temperature range to the second temperature range, the image processing apparatus 100 determines whether or not a saturated region detected in the first temperature range is a region saturated by sunlight.

If the image processing apparatus 100 does not determine that a saturated region is detected in the imaging data generated after the dynamic range is changed to the second temperature range (Step S13: No), the saturated region detected in the first temperature range is not a region saturated by sunlight. Therefore, the image processing apparatus 100 returns the setting of the dynamic range from the second temperature range to the first temperature range (Step S18), and the process returns to Step S11 again.

On the other hand, if the image processing apparatus 100 determines that a saturated region is detected in the imaging data generated after the dynamic range is changed to the second temperature range (Step S13: Yes), the saturated region is a region saturated by sunlight. Therefore, the image processing apparatus 100 closes the shutter 901 (Step S14).

Next, the image processing apparatus 100 returns the dynamic range from the second temperature range to the first temperature range again (Step S15). Further, the image processing apparatus 100 determines whether or not an abnormal region is detected in the imaging data generated in a state in which the shutter 901 is closed (Step S16).

If the image processing apparatus 100 determines that an abnormal region is detected in the imaging data generated in a state in which the shutter 901 is closed (Step S16: Yes), it repeats Step S16. That is, the image processing apparatus 100 sequentially acquires imaging data generated in a state in which the shutter 901 is closed, and determines whether or not an abnormal region is detected in the acquired imaging data.

On the other hand, if the image processing apparatus 100 does not determine that an abnormal region is detected in the imaging data generated in a state in which the shutter 901 is closed (Step S16: No), it opens the shutter 901 (Step S17). Note that the reason why the image processing apparatus 100 opens the shutter 901 is that the abnormal state of the imaging device, which abnormal state is due to sunlight, has been eliminated. The image processing apparatus 100 opens the shutter 901 and then repeats the processes in Step S11 and subsequent Steps again. Note that the order of Steps S15 and S16 may be reversed.

Figure 3:
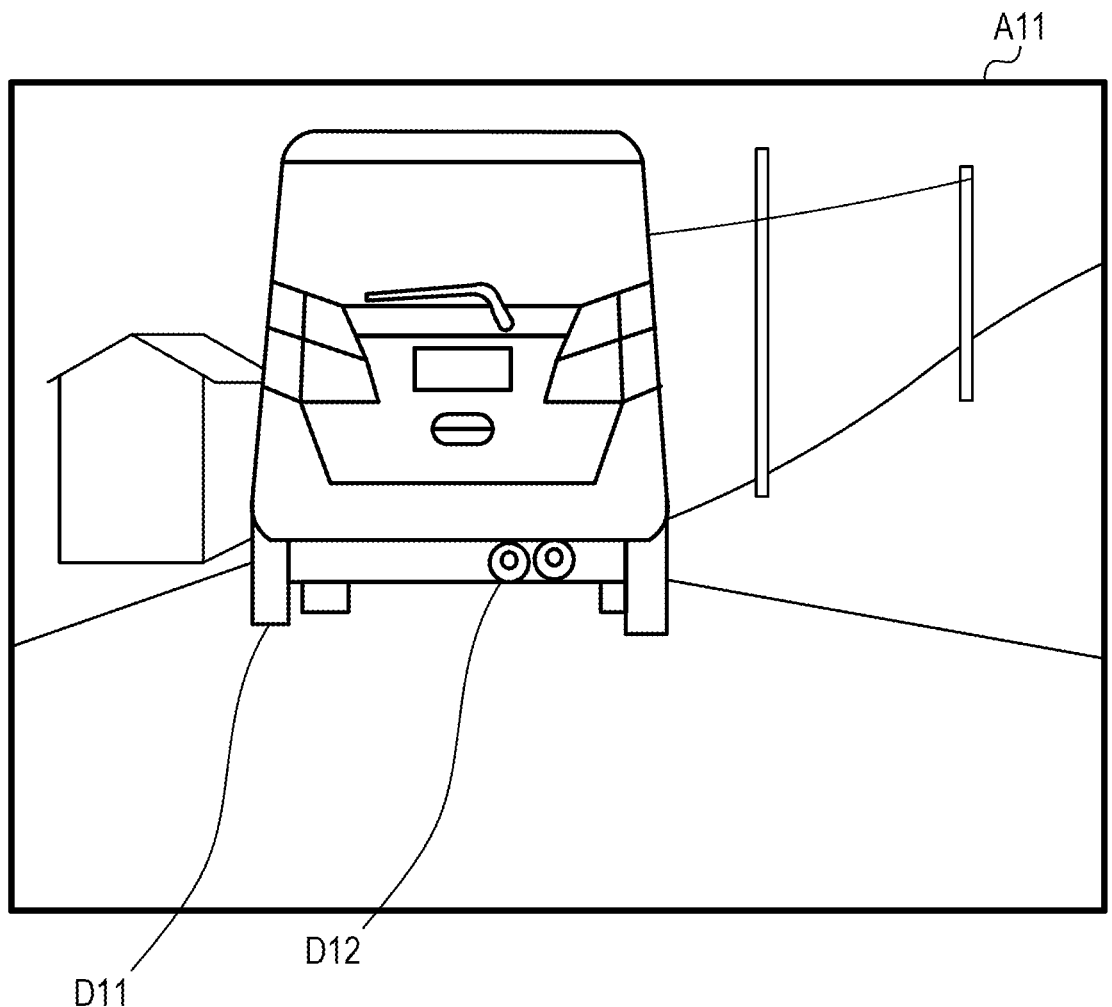
FIG. 3 is a diagram showing a first example of an image generated by the image processing apparatus according to the first embodiment.

Next, a difference in settings of the dynamic ranges will be described with reference to an example of a thermal image. FIG. 3 is a diagram showing a first example of an image generated by the image processing apparatus according to the first embodiment. FIG. 3 shows a thermal image A11 generated by the image processing apparatus 100. The thermal image A11 shown in FIG. 3 is an example of an image captured when the dynamic range of the microbolometer 900 is set to the first temperature range. The thermal image A11 is an image in which the traveling direction of a vehicle on which the thermal image display system 10 is mounted is captured. The thermal image A11 includes another vehicle D11. Further, the other vehicle D11 includes a muffler D12.

In the thermal image A11, since an electromagnetic wave radiated by an object is detected, a part of the thermal image A11 where heat is high is brightly displayed. Therefore, in the thermal image A11, the other vehicle D11 is displayed relatively brightly. Further, in the other vehicle D11, the color of the muffler D12 having a particularly high temperature is white. The luminance of the muffler D12, the color of which is white in the thermal image A11, is saturated.

Figure 4:
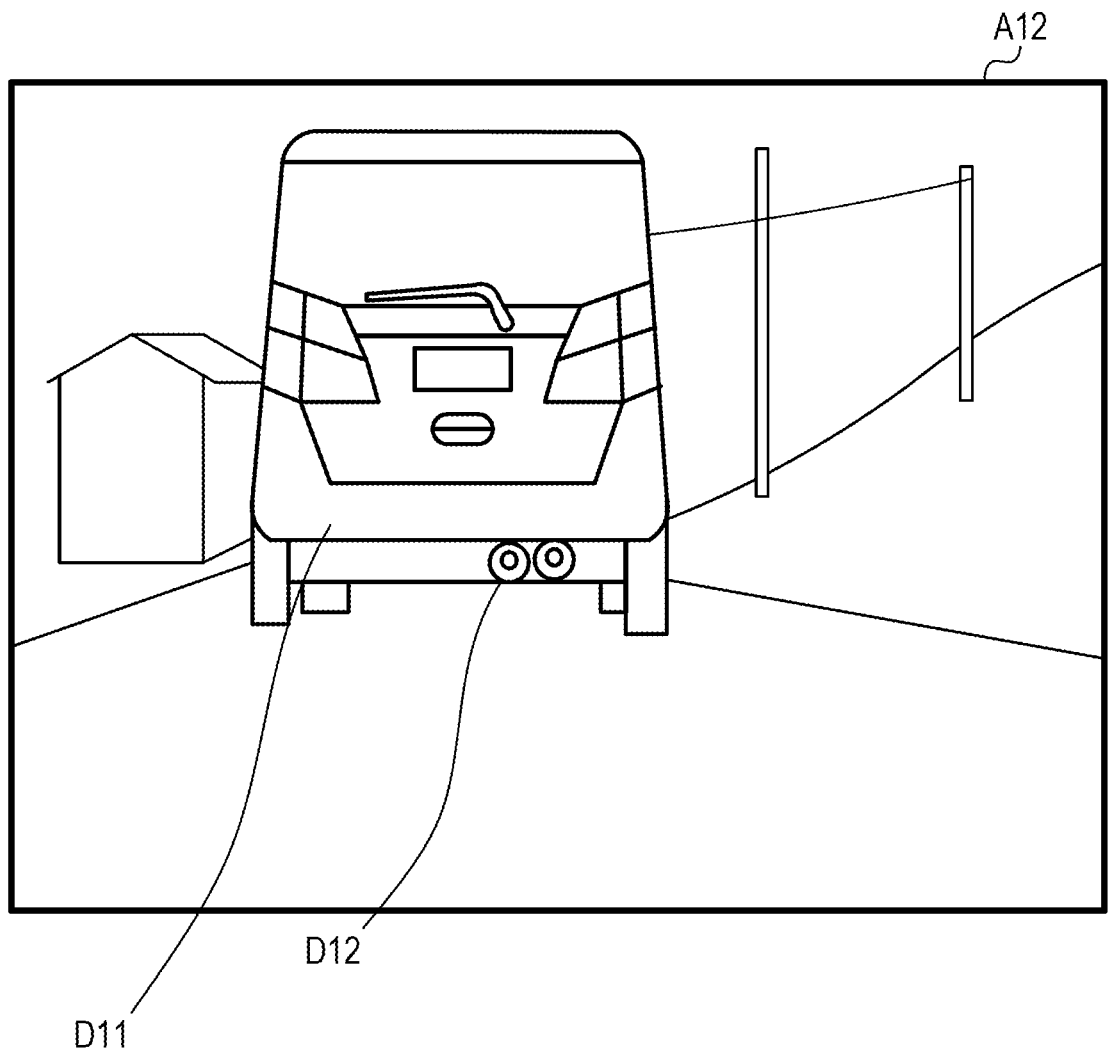
FIG. 4 is a diagram showing a second example of an image generated by the image processing apparatus according to the first embodiment.

Next, an image in a case in which the dynamic range is set to the second temperature range will be described with reference to FIG. 4. FIG. 4 is a diagram showing a second example of an image generated by the image processing apparatus according to the first embodiment. A thermal image A12 shown in FIG. 4 is an example of an image captured when the dynamic range of the microbolometer 900 is set to the second temperature range that is wider than the first temperature range.

The bright area of the thermal image A12 has been generally reduced so as to be less than that of the thermal image A11. Further, the tone of the other vehicle D11 is dark, and the muffler D12 is not saturated.

As described above, regarding a saturated region captured when the dynamic range is set to the first temperature range, the dynamic range is changed to the second temperature range, whereby the region is no longer saturated. Therefore, the image processing apparatus 100 can return the dynamic range to the first temperature range again and continue capturing images without closing the shutter 901.

Figure 5:
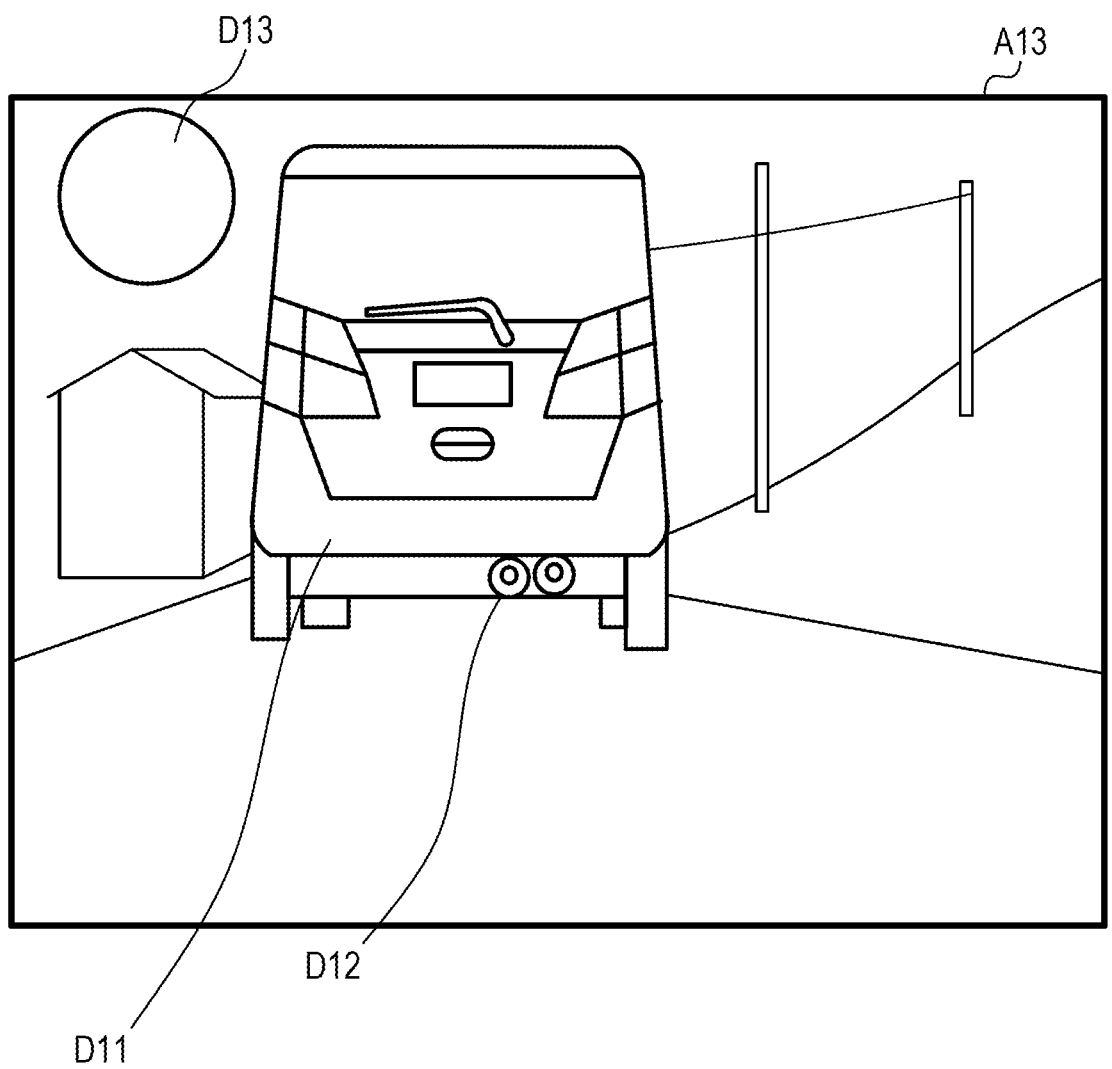
FIG. 5 is a diagram showing a third example of an image generated by the image processing apparatus according to the first embodiment.

Next, FIG. 5 will be described. FIG. 5 is a diagram showing a third example of an image generated by the image processing apparatus according to the first embodiment. A thermal image A13 shown in FIG. 5 is an example of an image captured when the dynamic range of the microbolometer 900 is set to the first temperature range. The thermal image A13 includes the sun D13 in the upper left of the image in addition to the other vehicle D11. As shown in FIG. 5, the color of the sun D13 is white since the temperature thereof is high. That is, the luminance of the part of the image that displays the sun D13 is saturated.

Figure 6:
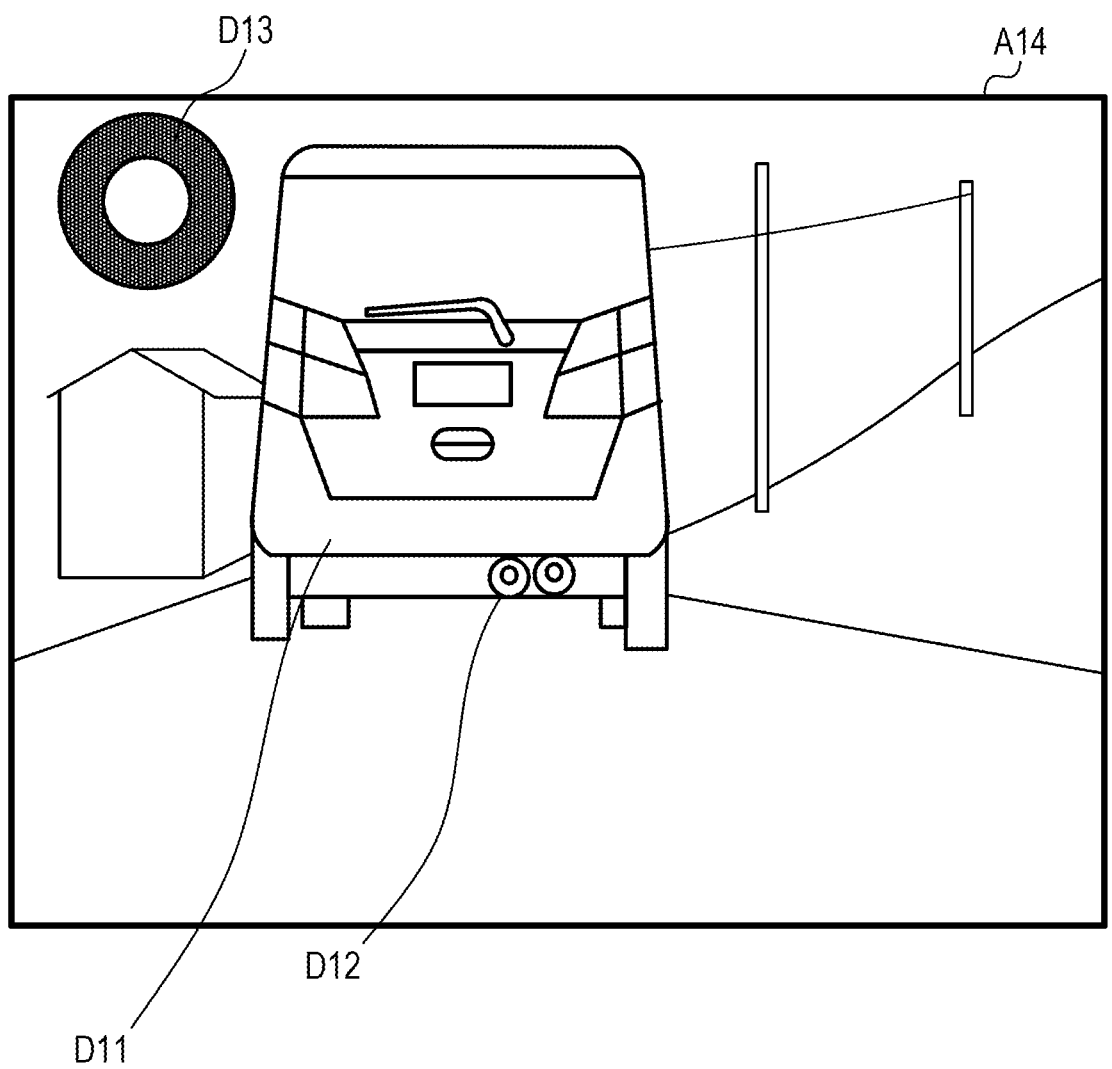
FIG. 6 is a diagram showing a fourth example of an image generated by the image processing apparatus according to the first embodiment.

Next, FIG. 6 will be described. FIG. 6 is a diagram showing a fourth example of an image generated by the image processing apparatus according to the first embodiment. A thermal image A14 shown in FIG. 6 is an example of an image captured when the dynamic range of the microbolometer 900 is set to the second temperature range.

The bright area of the thermal image A14 has been generally reduced so as to be less than that of the thermal image A13. Further, the tone of the other vehicle D11 is dark, and the muffler D12 is not saturated. Meanwhile, although the saturated region of the sun D13 has been reduced slightly, the central part thereof is saturated.

As described above, in a region in which the luminance is saturated when the image is captured in a state in which the dynamic range is set to the first temperature range, the sunlight is saturated even when the dynamic range is changed to the second temperature range. Therefore, the image processing apparatus 100 appropriately recognizes that there is sunlight and closes the shutter in order to protect the imaging device.

The first embodiment has been described above. The image processing apparatus 100 is not limited to the one described above. For example, the image processing apparatus 100 may include at least one of the microbolometer 900, the shutter 901, and the monitor 902 in addition to the components described above. In the image processing apparatus 100, the components described in FIG. 1 may be provided separately from each other, or a plurality of components may be formed integrally with each other. Some of the components described in FIG. 1 may be provided at a remote location, and the configuration described above may be implemented by wireless communication.

As described above, when the image processing apparatus 100 according to the first embodiment detects that a pixel is saturated in a state in which the dynamic range is in the first temperature range, the image processing apparatus 100 can suitably detect sunlight by changing the dynamic range to the second temperature range that is wider than the first temperature range. Therefore, according to the first embodiment, it is possible to provide an image processing apparatus and the like that appropriately detect sunlight and then protect an infrared sensor from the sunlight.

Second Embodiment

Figure 7:
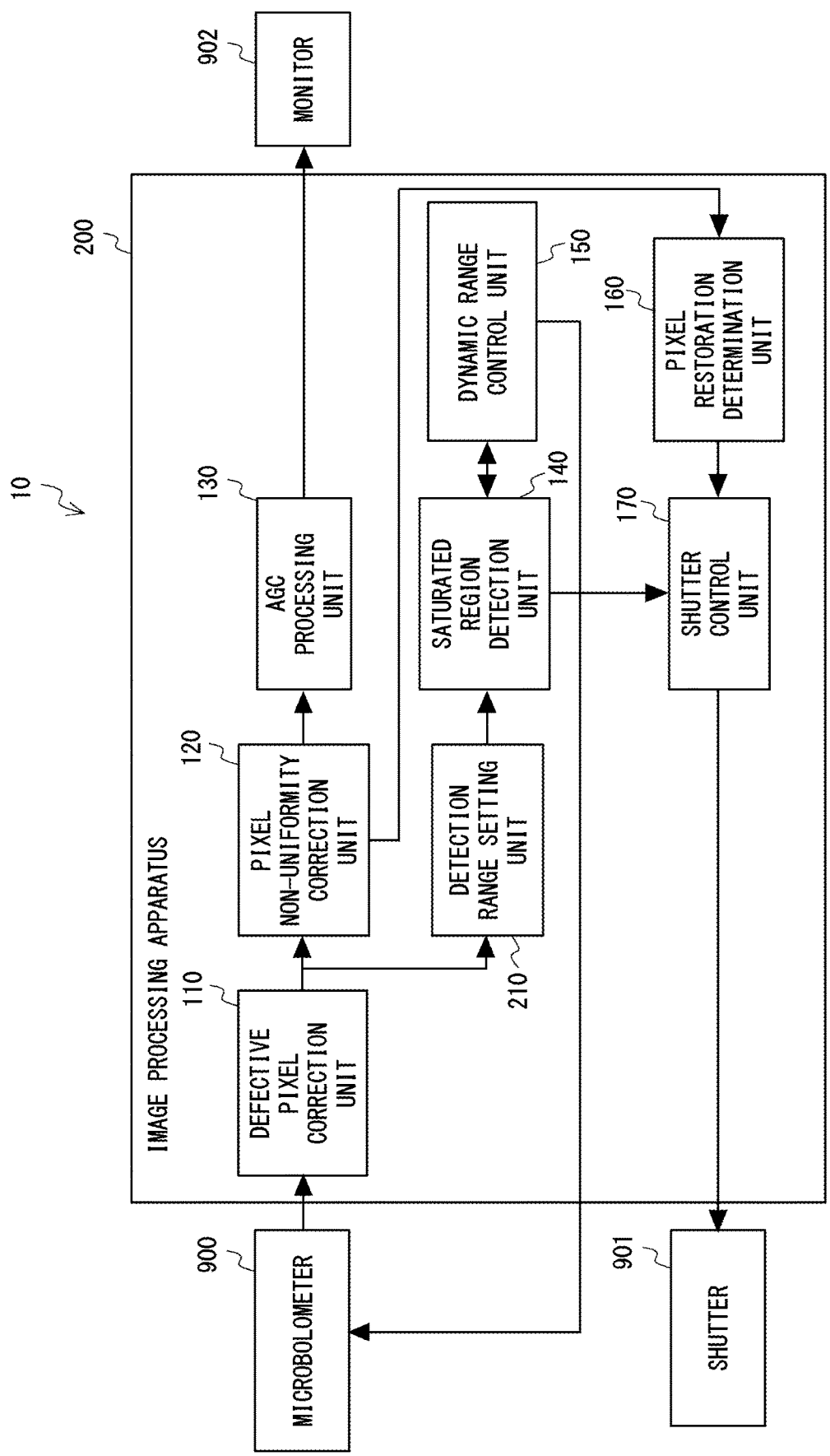
FIG. 7 is a block diagram of an image processing apparatus according to a second embodiment.

Next, a second embodiment will be described. FIG. 7 is a block diagram of an image processing apparatus according to the second embodiment. FIG. 7 shows the thermal image display system 10 according to the second embodiment. The thermal image display system 10 includes an image processing apparatus 200 in place of the image processing apparatus 100. The image processing apparatus 200 differs from the image processing apparatus 100 in that it includes a detection range setting unit 210.

The defective pixel correction unit 110 receives imaging data from the microbolometer 900 and supplies the corrected imaging data to the pixel non-uniformity correction unit 120 and the detection range setting unit 210, respectively.

The detection range setting unit 210 sets a range (a detection range) within which the saturated region detection unit 140 detects a saturated region. Specifically, for example, the detection range setting unit 210 receives the imaging data from the defective pixel correction unit 110 and cuts out the set detection range, which is a part of the received imaging data. The detection range may be one predetermined range or may vary in accordance with a predetermined condition. For example, the detection range setting unit 210 may set the detection range using at least one of a time, weather, an attitude of a vehicle, and a traveling direction of a vehicle as a parameter. When the detection range setting unit 210 has cut out the detection range, it supplies the cut out imaging data to the saturated region detection unit 140. Therefore, the saturated region detection unit 140 detects a saturated region from the received imaging data in a manner similar to that by which a saturated region is detected from the received imaging data in the case of the first embodiment.

Figure 8:
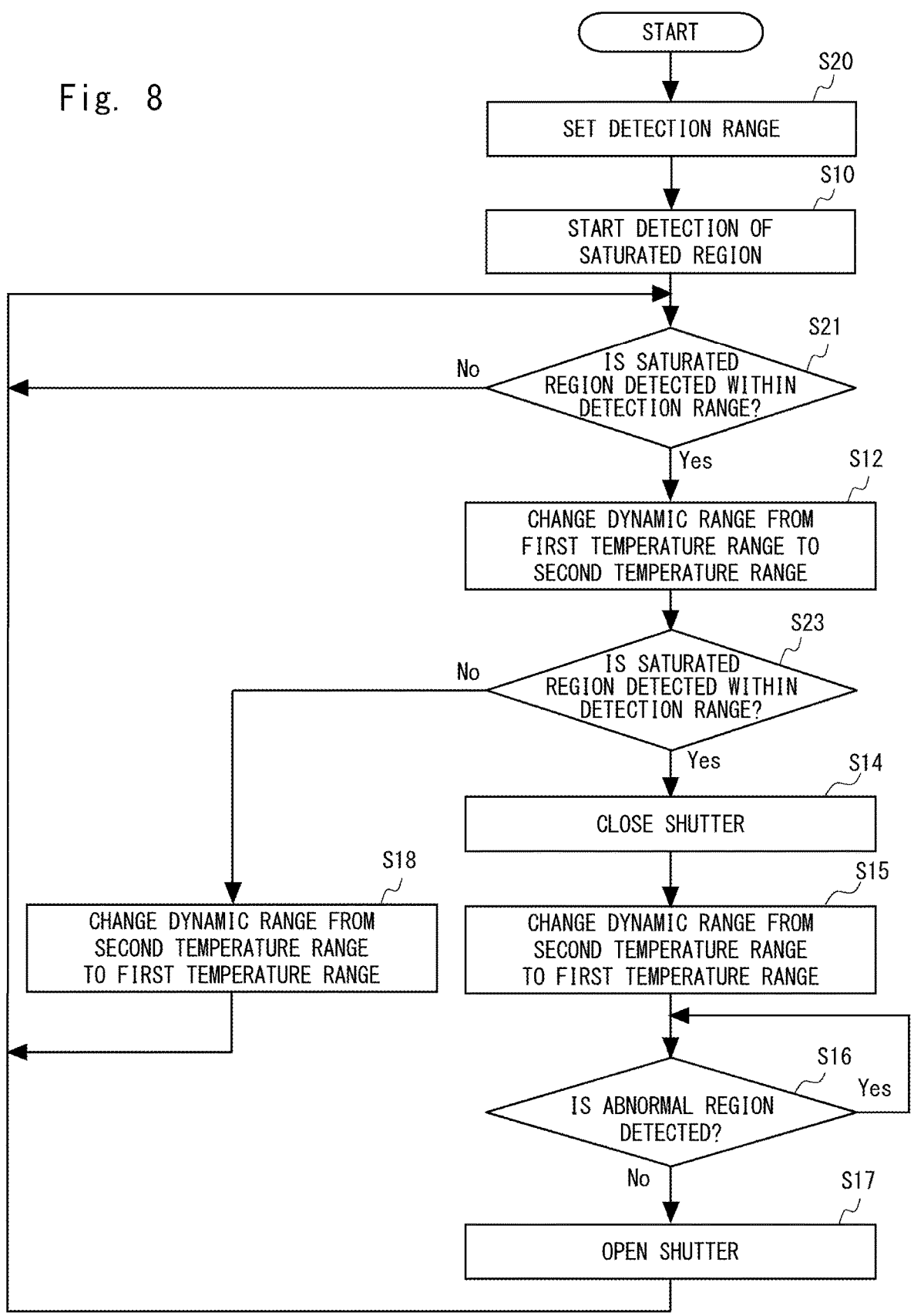
FIG. 8 is a flowchart of the image processing apparatus according to the second embodiment.

Next, processes performed by the image processing apparatus 200 according to the second embodiment will be described. FIG. 8 is a flowchart of the image processing apparatus according to the second embodiment.

First, the image processing apparatus 200 sets a detection range (Step S20). After the image processing apparatus 200 sets the detection range, it starts detection of a saturated region within the detection range (Step S10).

Next, the image processing apparatus 200 determines whether or not a saturated region is detected within the detection range of imaging data (Step S21). If the image processing apparatus 200 does not determine that a saturated region is detected within the detection range (Step S21: No), it repeats Step S21. That is, the image processing apparatus 200 successively detects a saturated region within the detection range in the imaging data to be acquired. If the image processing apparatus 200 determines that a saturated region is detected within the detection range (Step S21: Yes), it changes the dynamic range from the first temperature range to the second temperature range (e.g., from 10 degrees to 200 degrees) (Step S12).

Next, the image processing apparatus 200 determines whether or not a saturated region is detected within the detection range in the imaging data generated after the dynamic range is changed (Step S23). If the image processing apparatus 200 does not determine that a saturated region is detected within the detection range in the imaging data generated after the dynamic range is changed to the second temperature range (Step S23: No), the saturated region detected in the first temperature range is not a region saturated by sunlight. Therefore, the image processing apparatus 200 returns the setting of the dynamic range from the second temperature range to the first temperature range (Step S18), and the process returns to Step S21 again.

On the other hand, if the image processing apparatus 200 determines that a saturated region is detected in the imaging data generated after the dynamic range is changed to the second temperature range (Step S23: Yes), the saturated region is a region saturated by sunlight. Therefore, the image processing apparatus 200 closes the shutter 901 (Step S14). The processes from Steps S14 to S17 are similar to those described in the first embodiment. Therefore, the descriptions thereof will be omitted.

By performing the processes described above, the image processing apparatus 200 according to the second embodiment detects a saturated region within a set detection range. Therefore, the image processing apparatus 200 can execute the processes at a high speed. Note that the process in Step S20 may be performed before the image processing apparatus 200 acquires imaging data from the microbolometer 900.

Figure 9:
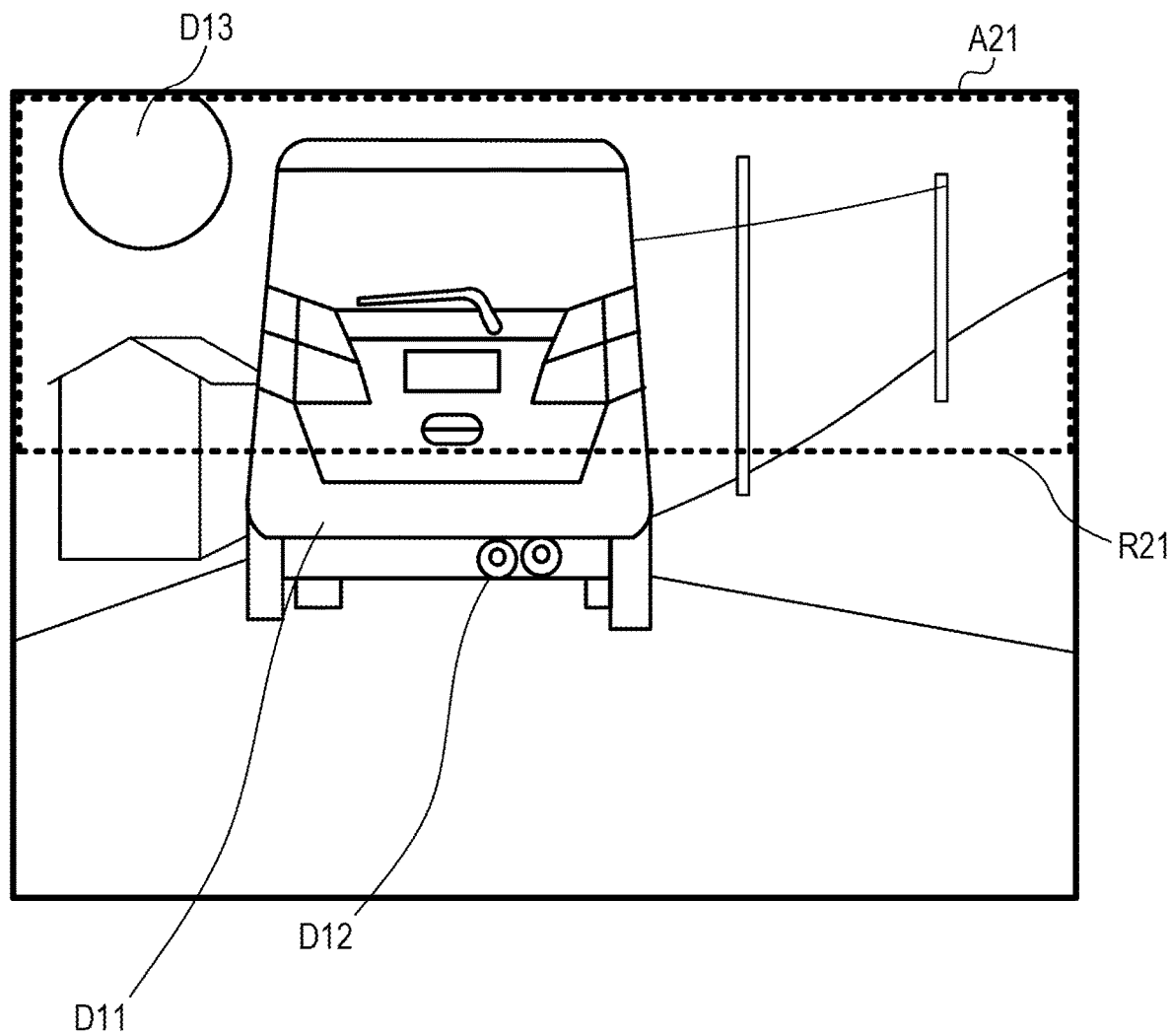
FIG. 9 is a diagram showing an example of an image generated by the image processing apparatus according to the second embodiment.

Next, the setting of the detection range will be further described with reference to an example of a thermal image. FIG. 9 is a diagram showing an example of an image generated by the image processing apparatus according to the second embodiment. FIG. 9 shows a thermal image A21 generated by the image processing apparatus 200. The thermal image A21 shown in FIG. 9 is an example of an image captured when the dynamic range of the microbolometer 900 is set to the first temperature range. The thermal image A21 includes the other vehicle D11, the muffler D12, and the sun D13. As shown in FIG. 9, the color of each of the muffler D12 and the sun D13 is white since the temperatures thereof are relatively high. That is, the luminance of the part of the image that displays the muffler D12 and the sun D13 is saturated.

In FIG. 9, a detection range R21 is shown. A dot-dashed line in FIG. 9 indicates a boundary line of a rectangle defining the detection range R21. That is, the region inside the rectangle indicated by the dot-dashed line is the detection range R21. The detection range R21 shown in FIG. 9 is a range that occupies about 40% of the thermal image A21 on the upper side thereof in the vertical direction. That is, the image processing apparatus 200 detects a saturated region within the detection range R21 cut out from imaging data. Therefore, the image processing apparatus 200 performs the above-described processes on the region in which an image of the sun D13 is captured without detecting the muffler D12 as a saturated region.

Note that, in the above-described setting of the detection range, the detection range setting unit 210 can set a state in which there is no detection range (i.e., a state in which the detection range is not to be cut out). Further, in the above-described setting of the detection range, the detection range setting unit 210 may set a detection range using at least one of a time, weather, an attitude of a vehicle, and a traveling direction of a vehicle as a parameter.

For example, the detection range setting unit 210 may set a state in which there is no detection range at a time when the sun does not appear. Further, the detection range setting unit 210 may acquire weather information and set a state in which there is no detection range when it rains. Further, the detection range setting unit 210 may extend the detection range to a lower side of the thermal image A21 in the morning or evening when the position of the sun is relatively low, and narrow the detection range to an upper side of the thermal image A21 in the daytime when the position of the sun is relatively high. Further, the detection range setting unit 210 may detect the attitude of a vehicle, and may increase the detection range when the vehicle is going uphill and narrow the detection range when the vehicle is going downhill. Further, the detection range setting unit 210 may detect time information and the traveling direction of a vehicle, and may set a wide detection range, for example, when the vehicle is traveling in an eastward direction in the morning, and may set a state in which there is no detection range when the vehicle is traveling in a westward direction in the morning.

As described above, when the image processing apparatus 200 according to the second embodiment detects that a pixel is saturated in a state in which the dynamic range is in the first temperature range, the image processing apparatus 200 can suitably detect sunlight by changing the dynamic range to the second temperature range that is wider than the first temperature range. Further, the image processing apparatus 200 can efficiently detect sunlight by setting a detection range. Therefore, according to the second embodiment, it is possible to provide an image processing apparatus and the like that appropriately detect sunlight and then protect an infrared sensor from the sunlight.

Note that the above-described program can be stored and provided to a computer using any type of non-transitory computer readable media. The non-transitory computer readable media includes any type of tangible storage media. Examples of the non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of the transitory computer readable media include electric signals, optical signals, and electromagnetic waves. The transitory computer readable media can provide the program to a computer via a wired communication line such as an electric wire and an optical fiber, or a wireless communication line.

Note that the present invention is not limited to the above-described embodiments and may be changed as appropriate without departing from the spirit of the present invention. For example, the image processing apparatus can be applied not only to an automobile but also to a mobile body such as a motorcycle, a ship, an airplane, a mobile robot, and a drone.

For example, the present disclosure can be applied to an image processing apparatus which is mounted on a mobile body such as an automobile, a motorcycle, a ship, an airplane, a mobile robot, and a drone.

What is claimed is:
1. An image processing apparatus comprising:
a saturated region detection unit configured to acquire imaging data from an infrared imaging device and detect that a saturated region is present in the imaging data, the infrared imaging device being configured to capture a thermal image of an outside of a mobile body;

a dynamic range control unit configured to set, in accordance with a result of the detection of the saturated region, a dynamic range to a first temperature range where a temperature on an upper limit side is saturated due to a temperature of another vehicle, or a second temperature range where a temperature at least on an upper limit side is higher than that in the first temperature range and remains unsaturated regardless of a temperature of the other vehicle, the dynamic range being a temperature range detected by the infrared imaging device; and a shutter control unit configured to control opening and closing of a shutter for protecting the infrared imaging device based on the result of the detection of the saturated region and the setting of the dynamic range, wherein the dynamic range control unit changes the setting of the dynamic range from the first temperature range to the second temperature range when the dynamic range is set to the first temperature range and the saturated region detection unit detects the saturated region, and the dynamic range control unit changes the setting of the dynamic range from the second temperature range to the first temperature range when the dynamic range is set to the second temperature range and the saturated region detection unit does not detect the saturated region, and the shutter control unit closes the shutter when the saturated region detection unit detects the saturated region in a state in which the dynamic range is set to the second temperature range.

2. The image processing apparatus according to claim 1, wherein the dynamic range control unit sets an upper limit of the temperature range detected by the infrared imaging device to 50 degrees as the first temperature range, and sets the upper limit of the temperature range detected by the infrared imaging device to 200 degrees as the second temperature range.

3. The image processing apparatus according to claim 1, wherein the saturated region detection unit detects the saturated region within a range of the thermal image on an upper side thereof in a vertical direction, the range being a part of the imaging data.

4. The image processing apparatus according to claim 1, further comprising a detection range setting unit configured to set a detection range within which the saturated region is detected in the imaging data,
wherein the detection range setting unit sets the detection range using at least one of a time, weather, an attitude of the mobile body, and a traveling direction of the mobile body as a parameter.

5. An image processing method comprising:
an imaging data acquisition step of acquiring imaging data from an infrared imaging device configured to capture a thermal image of an outside of a mobile body;
a saturated region detection step of detecting that a saturated region is present in the imaging data;
a dynamic range control step of setting, in accordance with a result of the detection of the saturated region, a dynamic range to a first temperature range where a temperature on an upper limit side is saturated due to a temperature of another vehicle, or a second temperature range where a temperature at least on an upper limit side is higher than that in the first temperature range and remains unsaturated regardless of a temperature of the other vehicle, the dynamic range being a temperature range detected by the infrared imaging device; and
a shutter control step of controlling opening and closing of a shutter for protecting the infrared imaging device based on the result of the detection of the saturated region and the setting of the dynamic range, wherein
in the dynamic range control step, the setting of the dynamic range is changed from the first temperature range to the second temperature range when the dynamic range is set to the first temperature range and the saturated region is detected in the saturated region detection step, and the setting of the dynamic range is changed from the second temperature range to the first temperature range when the dynamic range is set to the second temperature range and the saturated region is dot detected in the saturated region detection step, and
in the shutter control step, the shutter is closed when the saturated region detection unit detects the saturated region in a state in which the dynamic range is set to the second temperature range.

6. A non-transitory computer readable medium storing a program for causing a computer to execute an image processing method, the image processing method comprising:
an imaging data acquisition step of acquiring imaging data from an infrared imaging device configured to capture a thermal image of an outside of a mobile body;
a saturated region detection step of detecting that a saturated region is present in the imaging data;
a dynamic range control step of setting, in accordance with a result of the detection of the saturated region, a dynamic range to a first temperature range where a temperature on an upper limit side is saturated due to a temperature of another vehicle, or a second temperature range where a temperature at least on an upper limit side is higher than that in the first temperature range and remains unsaturated regardless of a temperature of the other vehicle, the dynamic range being a temperature range detected by the infrared imaging device; and
a shutter control step of controlling opening and closing of a shutter for protecting the infrared imaging device based on the result of the detection of the saturated region and the setting of the dynamic range, wherein
in the dynamic range control step, the setting of the dynamic range is changed from the first temperature range to the second temperature range when the dynamic range is set to the first temperature range and the saturated region is detected in the saturated region detection step, and the setting of the dynamic range is changed from the second temperature range to the first temperature range when the dynamic range is set to the second temperature range and the saturated region is dot detected in the saturated region detection step, and
in the shutter control step, the shutter is closed when the saturated region detection unit detects the saturated region in a state in which the dynamic range is set to the second temperature range.

* * * * *